United States Patent [19]

Zeiträger et al.

[11] 4,346,863
[45] Aug. 31, 1982

[54] ATTACHMENT DEVICE FOR A BRAKE HOSE

[75] Inventors: Günther Zeiträger, Hattersheim; Gerhard Krause, Flörsheim; Herbert Guthmann, Bischofsheim, all of Fed. Rep. of Germany

[73] Assignee: General Motors Corporation, Detroit, Mich.

[21] Appl. No.: 197,894

[22] Filed: Oct. 17, 1980

[30] Foreign Application Priority Data

Feb. 7, 1980 [DE] Fed. Rep. of Germany ....... 3004421

[51] Int. Cl.³ .............................................. A62C 23/04
[52] U.S. Cl. ............................................ 248/75; 248/56
[58] Field of Search ................... 248/75, 79, 65, 56, 248/27.1, 51, 52; 285/62, 61, 158; 280/668

[56] References Cited

U.S. PATENT DOCUMENTS

| | | | |
|---|---|---|---|
| 814,733 | 3/1906 | Sartain | 248/53 |
| 1,056,392 | 3/1913 | Barr et al. | 174/153 G |
| 1,204,625 | 11/1916 | Wheelock | 248/56 |
| 1,555,126 | 10/1925 | Preston | 248/65 |
| 2,078,453 | 4/1937 | Miller | 248/62 X |
| 2,238,003 | 4/1941 | Wilkinson | 248/201 X |
| 2,546,792 | 3/1951 | Smith et al. | 248/56 X |
| 3,167,397 | 1/1965 | Skeggs et al. | 248/27.1 |
| 3,650,545 | 3/1972 | Freed | 248/51 X |
| 3,717,319 | 2/1973 | Schultz et al. | 248/51 X |
| 3,751,075 | 8/1973 | Rosenberg | 285/61 |
| 3,788,582 | 1/1974 | Swanquist | 248/56 |

Primary Examiner—William H. Schultz
Assistant Examiner—Ramon O. Ramirez
Attorney, Agent, or Firm—Doonan D. McGraw

[57] ABSTRACT

A device for securing a brake hose between the hose connection point located on the vehicle body and the hose connection point on the wheel brake assembly, at a part, such as the resilient strut, with which the brake assembly is connected in a motionally responsive manner. The hose is so laid as to compensate for changes in spacing between the hose connection points due to inspringing and/or steering movements.

5 Claims, 8 Drawing Figures

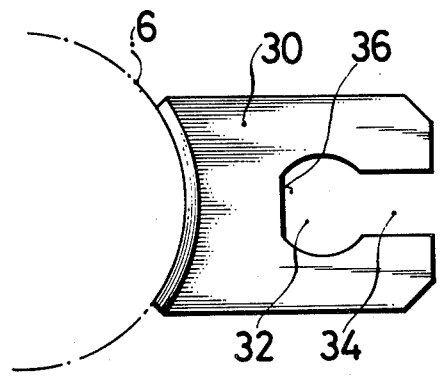
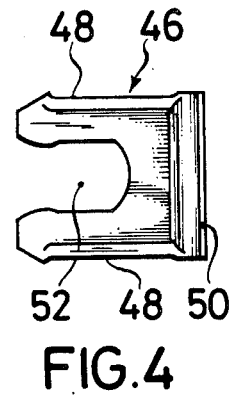
FIG.3 　　　　　　FIG.4
FIG.5 　　　　　　FIG.7
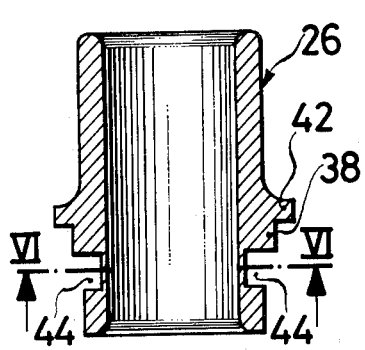
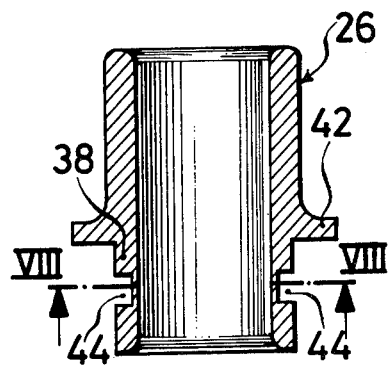
FIG.6 　　　　　　FIG.8
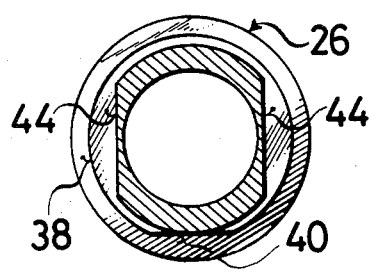
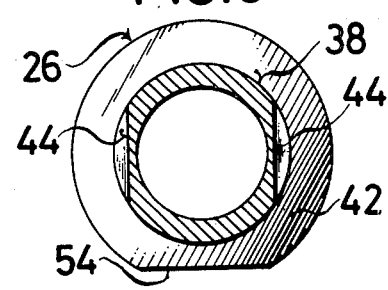

ATTACHMENT DEVICE FOR A BRAKE HOSE

The invention relates to a device for securing a brake hose between an attachment point located on the vehicle body and the connection point on the wheel brake assembly, which may be a brake caliper, at a part, e.g. the resilient strut, with which the brake caliper, particularly a floating caliper, is connected in a motionally responsive manner.

From the rigid brake lines located on the vehicle body and from a certain point situated on it, brake hoses lead to connection points on the brake calipers. Particularly at the front wheels, and due to the in-springing and the steering movement, these connection points change their distance from the attachment points on the vehicle body. The brake hose is so laid that it is able to compensate for this change in spacing. In order to attain better guiding for the brake hose, it is moreover led only as far as a part which is involved in the in-springing and steering movements, e.g. the resilient strut, and it is secured there. From this point a rigid pipe may lead to the connection point on the brake caliper if it is a question of a fixed caliper where the connection point always keeps the same distance from the attachment point on the resilient strut. However, with the floating caliper, the connection point executes a relative movement with respect to the attachment point on the resilient strut at each actuation of the brake, so that consequently a rigid pipe can no longer be used here.

Therefore, it has already been proposed to use a continuous brake hose from the connection point on the caliper, up to the attachment point with the rigid pipe line installed at the vehicle body. The brake hose is merely held by means of a boss on the resilient strut in such a way that it is longitudinally displaceable and also rotatable therein. Here, there is the risk that through dirt, ice, and the like, the hose will become firmly clamped in the boss and will in fact possibly be in an unfavorable position or have an unfavorable course. By simply gripping the hose in an obvious manner by screws and using a kind of hose clamp or a damping yoke the hose may easily become tightly clamped and twisted in itself, with the result at a certain steering angle it becomes chafed by rubbing against an adjacent part.

The invention has therefore set itself the problem of creating a securing device of the above-described kind which provides a reliable and satisfactory intermediate attachment for the brake hose in simple manner. Further, as regards the connection point of the brake hose on the caliper, the invention makes it possible in simple manner, to secure the hose to the holding part in one certain peripheral position only, so that an attachment with the hose twisted, resulting in troublesome consequences, cannot take place. Again, the securing device may be so constructed that only the hose belonging to the particular model can be used, so that the brake hoses cannot become mixed up, during assembly.

According to the invention this is achieved by arranging that a sleeve, connected to the brake hose rotationally fast and axially indisplaceable, is mounted on the brake hose at a distance from the end of the brake hose connected to the caliper, which is greater than the distance of the attachment point from the connection point on the caliper, and the sleeve is fixable by clamping means to a holding part firmly connected to the resilient strut.

An appropriate construction is attained when the holding part is formed by a shackle protruding from the resilient strut and having an aperture for the sleeve, and the sleeve has a section which corresponds to the thickness of the shackle and of which the diameter is equal to or less than the diameter of the aperture, whilst underneath and above the section, means projecting beyond the diameter of the aperture, are provided for firmly clamping the sleeve.

In order to ensure that the attaching of the brake hose can take place only in the peripheral position in which it has the desired course, even during a relative movement of the resilient strut with respect to the vehicle body, it is further proposed to provide the holding part and the sleeve with cooperating faces which permit securing of the sleeve only in the respective peripheral position. This can be brought about by making the aperture in the holding part circular in shape and by providing a tangential flattening. The section of the sleeve also has a flattening which corresponds with the flattening in the aperture.

It is also possible to provide a flattening at other places in the sleeve, for example at the collar or at the section containing the clamping means, this flattening cooperating with a projection on the holding part. If a different kind of anti-twist security device is provided for each vehicle type, this prevents a mix-up of the hoses, or the fitting of a wrong one.

An advantageous kind of clamping attachment is obtained if the sleeve, above the section which cooperates with the holding part, is provided with a collar, whilst underneath the section it has two mutually opposite grooves for the insertion of a resilient slider supporting itself on the holding part. Instead of the two opposite grooves, one circulating groove could also be provided. Then the slider could be pushed on from each side. However, it is preferable to push the resilient slider on from one side, with the result that two opposite grooves must run at a certain angle with respect to the particular anti-twist security device.

The invention will be explained in detail with reference to the accompanying drawings in which.

FIG. 3 a plan on the shackle connected to the resilient strut;

FIG. 4 a plan on the resilient slider;

FIG. 5 a longitudinal section through the sleeve;

FIG. 6 a section along line VI—VI in FIG. 5;

FIG. 7 a further longitudinal section through the sleeve; and

FIG. 8 a section along line VIII—VIII in FIG. 7.

Figure 1:
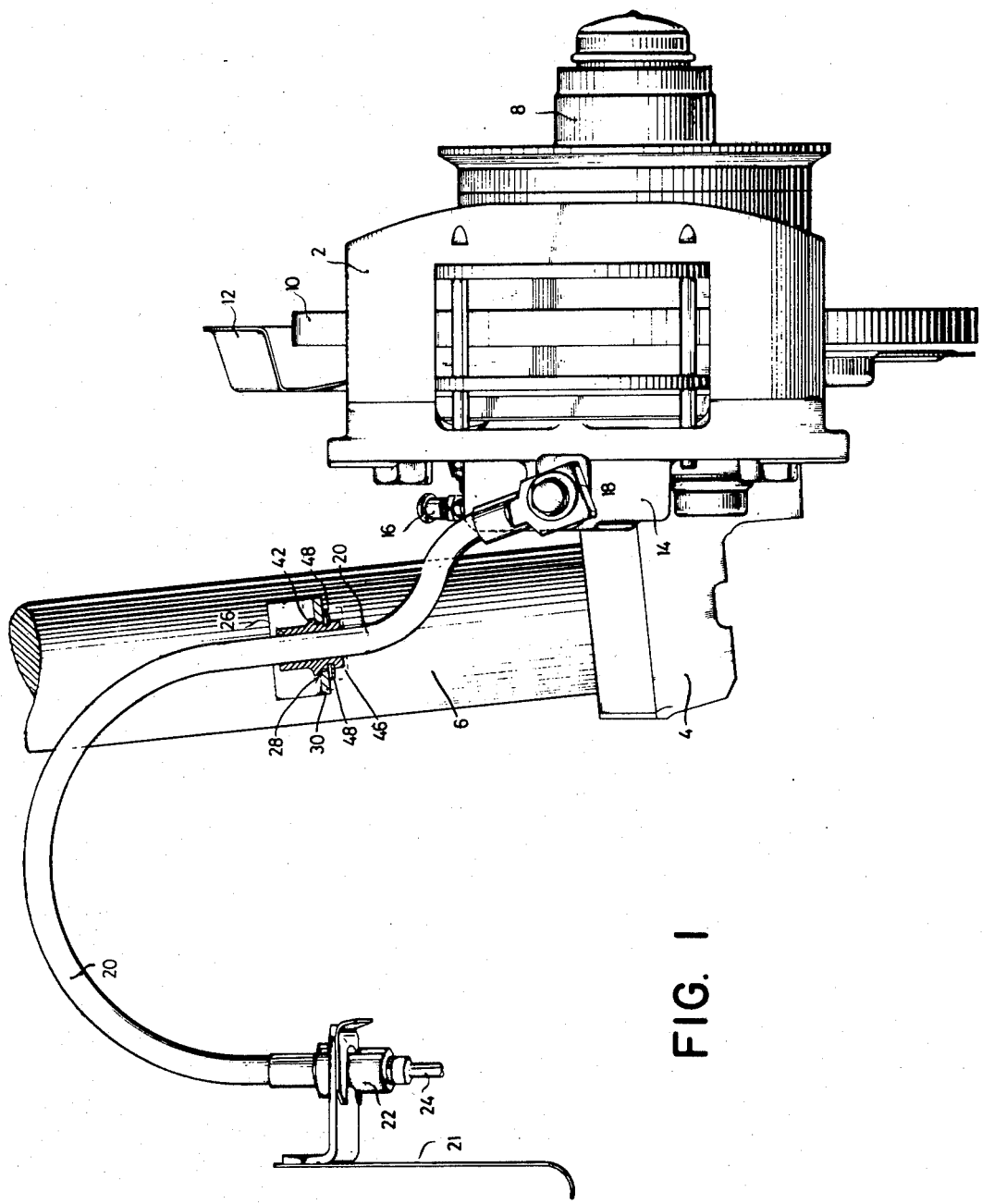
FIG. 1 shows the course of the brake hose from the brake caliper up to the point of connection with the rigid brake line.
Figure 2:
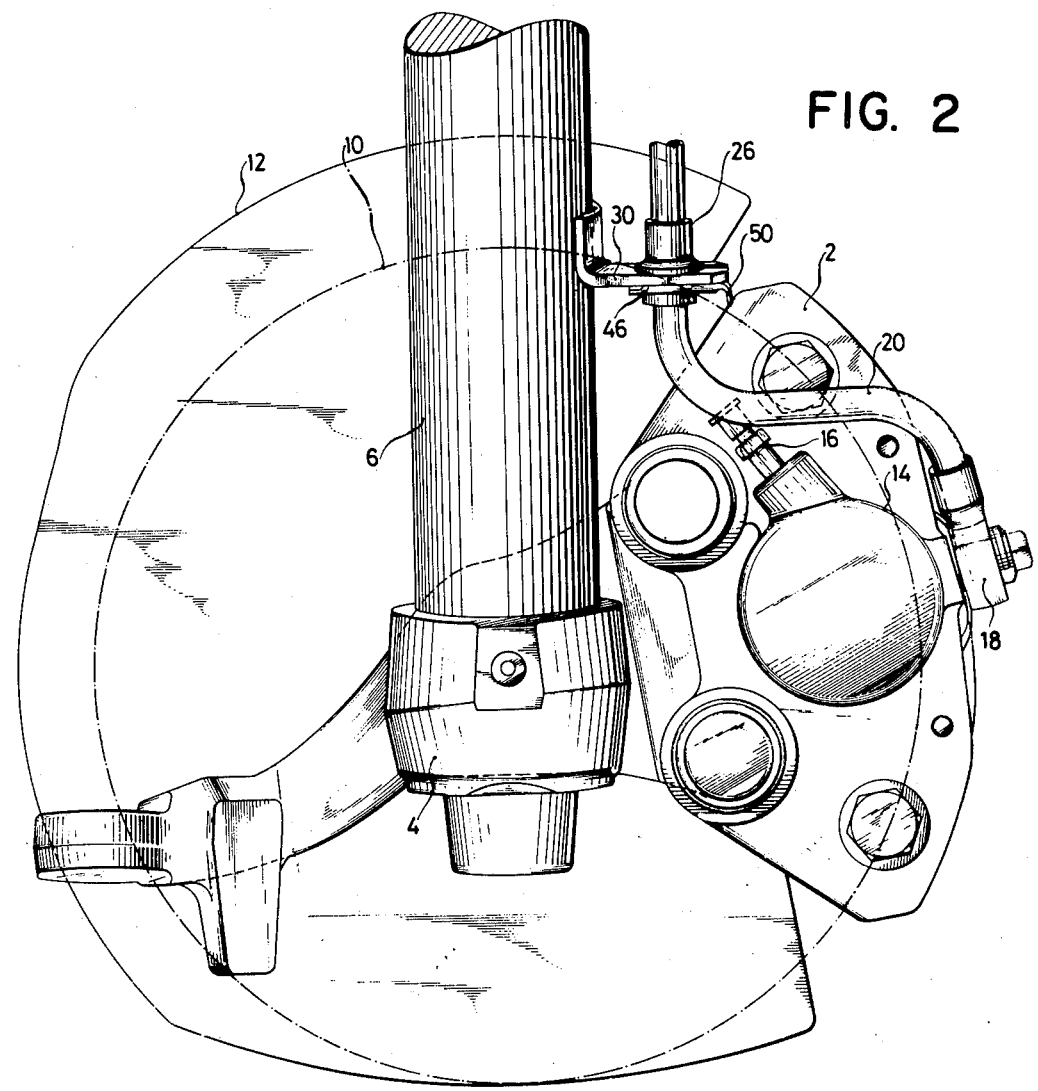
FIG. 2 is a side elevation with reference to FIG. 1.

In FIGS. 1 and 2, reference numeral 2 designates the brake caliper which is in the form of a floating caliper. It is connected to the steering knuckle 4, with which the resilient strut 6 is also in communication. The wheel bearing is designated by 8, the brake disc by 10, and a sheet-metal plate protecting the latter, by 12. The brake cylinder 14 of the floating caliper 2 is provided with a venting screw 16 and with the connection point 18 for the brake line, i.e. the brake hose, which, however, will not be considered in detail; neither with the further particulars of the floating caliper as these are well known already and are not of decisive importance for the invention.

From its attachment point 22 with the rigid brake line 24 situated on a bodywork part 21, the brake hose 20 is led to the connection point 18 on the brake caliper 2, in the manner indicated in FIG. 1. For the intermediate attachment of the brake hose 20 at the resilient strut 6, a sleeve 26 is pushed on to this hose 20 and is connected thereto, rotationally fast and indisplaceable, in some suitable manner. The distance of the sleeve 26 from the end of the brake hose 20 forming the connection point 18, is greater than the distance of the attachment point 28 for the intermediate hose fixing, from the connection point 18 on the brake caliper 2. The result is that from the attachment point 28 to the connection point 18, the brake hose assumes the bow-shaped course as indicated in FIG. 1. Relative movements between the connection point 18 and the attachment point 28 i.e. to the resilient strut 6, are therefore taken up by this section of the hose 20.

For the intermediate hose fixing, a shackle 30 serving as a holding part is connected to the resilient strut 6, from which it protrudes. The connection is effected for example by welding a bend from the shackle 30 to the resilient strut 6. The shackle 30 is provided with an aperture 32 (FIG. 3) from which a slot 34 passes to the outer edge. The slot 34 has approximately the thickness of the hose 20. The aperture 32 is of substantially circular shape and is provided with a flattening 36.

The sleeve 26 has a section 38 whose diameter corresponds approximately to that of aperture 32. This section 38 also has a flattening 40 corresponding to the flattening 36 of aperture 32. Above section 38 the sleeve 26 is provided with a collar 42, whilst below section 38 the sleeve 26 is provided with two lateral grooves 44 and the diameter of the sleeve 26 is here somewhat reduced by comparison with section 38, but this is not necessarily the case.

In order that the sleeve 26, already connected to the brake hose 20, may be mounted on the shackle 30, hose 20 underneath sleeve 26 is first of all passed through the slot 34 in shackle 30 as far as the aperture 32. Then sleeve 26 is moved downwards until the collar 42 rests on shackle 30, that is, section 38 comes to lie in aperture 32. This is only possible however, if the flattening 40 on section 38 corresponds exactly with the flattening 36 at the aperture. This ensures that the sleeve 26, and therefore hose 20, can only be secured in the desired peripheral position, in which no twisting of the same can take place.

The height of section 38 of sleeve 26 corresponds approximately to the thickness of shackle 30. The grooves 44 therefore come to lie directly underneath shackle 30. Clamping means in the form of a slider 46 of resilient construction and provided with a slot 52, is now pushed into the grooves 44. The slider is shown in plan in FIG. 4. As will be apparent from FIG. 1, it has laterally raised edges 48 which lie against the shackle 30 with intense spring action, whilst the sections adjacent the slot support themselves in the grooves 44 of sleeve 26. For the purpose of assembling and dismantling, which always takes place from the same side, the slider 46 is provided with a bent-over part 50 (FIG. 2).

When the hose connection is approximately of the same configuration for different types of vehicles, arrangements must be made to ensure that the brake hose provided for one type of vehicle cannot be fitted in another type. Appropriately this can be brought about through the flattenings determining the peripheral position of sleeve 26. Whereas for one type of vehicle, the flattening 40 in FIG. 6 can be provided on section 38, for another type of vehicle it may be provided on collar 42, as FIG. 8 shows (flattening 54). A corresponding bulge or the like must then be formed on shackle 30. The flattening may also be provided below section 38.

The embodiments of the invention in which an exclusive property or privilege is claimed are defined as follows:

1. In a vehicle wheel brake installation wherein the wheel brake assembly is suspended with the wheel to be braked at a resilient strut to permit movement thereof relative to the vehicle body which is controlled and limited and wherein a flexible brake hose has one end attached to the vehicle body and the other end secured to the wheel brake assembly, the improvement for securing said brake hose in said installation comprising:

a device attaching an intermediate portion of the brake hose to a portion of the resilient strut in a motionally responsive manner, said device including a sleeve connected to the brake hose so as to be axially and rotationally fixed with respect thereto to a connection point thereon located at a distance along the brake hose from the securing point of said other end of the brake hose to the wheel brake assembly which is greater than the distance of said connection point from said securing point, a holding part firmly secured to the resilient strut, and clamping means fixing said sleeve to said holding part.

2. In a vehicle wheel brake installation wherein the wheel brake assembly is suspended with the wheel to be braked at a resilient strut to permit movement thereof relative to the vehicle body which is controlled and limited and wherein a flexible brake hose has one end attached to the vehicle body and the other end secured to the wheel brake assembly, the improvement for securing said brake hose in said installation comprising:

a device attaching an intermediate portion of the brake hose to a portion of the resilient strut in a motionally responsive manner, said device including a sleeve connected to the brake hose so as to be axially and rotationally fixed with respect thereto at a connection point thereon located at a distance along the brake hose from the securing point of said other end of the brake hose to the wheel brake assembly which is greater than the distance of said connection point from said securing point, a holding part firmly secured to the resilient strut, and clamping means fixing said sleeve to said holding part, said holding part being formed by a shackle protruding from said portion of the resilient strut and having an aperture receiving said sleeve, said sleeve having a section corresponding to the thickness of said shackle and of which the diameter is no greater than the diameter of the shackle aperture, and means underneath and above said sleeve section projecting beyond the diameter of the shackle aperture and firmly clamping said sleeve to said holding part.

3. The device of claim 2 in which said shackle is provided with a slot corresponding to the diameter of the brake hose and extending from said shackle aperture to an outer edge of said shackle.

4. In a vehicle wheel brake installation wherein the wheel brake assembly is suspended with the wheel to be braked at a resilient strut to permit movement thereof relative to the vehicle body which is controlled and limited and wherein a flexible brake hose has one end attached to the vehicle body and the other end secured to the wheel brake assembly, the improvement for securing said brake hose in said installation comprising:

a device attaching an intermediate portion of the brake hose to a portion of the resilient strut in a motionally responsive manner, said device including a sleeve connected to the brake hose so as to be axially and rotationally fixed with respect thereto at a connection point thereon located at a distance along the brake hose from the securing point of said other end of the brake hose to the wheel brake assembly which is greater than the distance of said connection point from said securing point, a holding part firmly secured to the resilient strut, and clamping means fixing said sleeve to said holding part, said holding part and said sleeve having cooperating faces for securing said sleeve in a predetermined peripheral position.

5. The device of claim 4 in which said shackle aperture is of circular shape and has a tangential flattening defining one of said cooperating faces and a section of said sleeve has a corresponding flattening defining the other of said cooperating faces.

* * * * *

UNITED STATES PATENT AND TRADEMARK OFFICE
CERTIFICATE OF CORRECTION

PATENT NO. : 4,346,863
DATED : August 31, 1982
INVENTOR(S) : Gunther Zeitrager

It is certified that error appears in the above—identified patent and that said Letters Patent is hereby corrected as shown below:

Column 2, line 65, "with" should read -- will --.

Column 4, line 22, "to" should read -- at --.

Signed and Sealed this

Eleventh Day of January 1983

[SEAL]

Attest:

GERALD J. MOSSINGHOFF

Attesting Officer        Commissioner of Patents and Trademarks